United States Patent [19]

Patterson

[11] 4,034,122
[45] July 5, 1977

[54] NON-FAT DRIED WHIPPING COMPOSITION

[76] Inventor: Bernard A. Patterson, 4040 N. LeClaire Ave., Chicago, Ill. 60641

[22] Filed: June 1, 1976

[21] Appl. No.: 691,834

[52] U.S. Cl. .............................. 426/570; 426/565; 426/654
[51] Int. Cl.² .......................................... A23L 1/00
[58] Field of Search .......... 426/564, 570, 565, 654

[56] References Cited

UNITED STATES PATENTS

| | | | |
|---|---|---|---|
| 3,582,357 | 6/1971 | Katz | 462/570 |
| 3,597,233 | 8/1971 | Patterson | 426/570 |

OTHER PUBLICATIONS

Corn Syrups and Sugars 2nd Ed., 1956, Corn Industries Res. Found, Washington, D.C., p. 15.

Primary Examiner—Jeanette M. Hunter
Attorney, Agent, or Firm—Hill, Gross, Simpson, Van Santen, Steadman, Chiara & Simpson

[57] ABSTRACT

A substantially non-fat dried whipping composition having improved whipping properties and capable of being reconstituted by whipping with water to a high yield topping, the composition consisting predominantly of at least one maltodextrin and corn syrup solids in combination with relatively smaller amounts of a polyoxyethylene sorbitan stearate containing from 15 to 25 ethylene oxide groups, a small amount of a food stabilizer and the balance being essentially a glyceride ester in which at least 90% of the ester groups present are long chain monester groups.

4 Claims, No Drawings

NON-FAT DRIED WHIPPING COMPOSITION

BACKGROUND OF THE INVENTION

1. Field of the Invention

This invention is in the field of edible, whippable toppings of the substantially non-fat type which are temperature stable, which hold up for long periods of time at ambient tmeperatures, which may be thawed and rewhipped when frozen, and will stand up in storage for indefinite periods of time.

2. Description of the Prior Art

Whippable compositions which are fairly stable and which contain substantial amounts of fat are well known commercially and are described in such patents as Diamond et al. U.S. Pat. No. 2,868,643 and in my own previous U.S. Pat. No. 3,383,219. In a later patent, U.S. Pat. No. 3,597,233, I described a temperature stable, essentially non-fat emulsion which had improved whipping properties and which had significantly improved yields. Typically, the compositions of my previous patent contained a sugar in combination with a non-ionic emulsifier, an edible salt bodying agent and salt.

Commercially available fat-type toppings usually yield an increase in volume to the extent of about 300 to 400% when chilled and whipped. At ambient temperatures, such whips may be held for only about 2 to 3 hours. When placed under refrigeration, they may be stable for as long as 2 weeks.

Some attempts have been made to employ various proteinaceous materials to stabilize non-fat whipping compositions. Among these materials are soy, albumen, calcium and sodium caseinates and egg albumens. While these materials sometimes provide high yields, they are relatively unstable and tend to exude moisture or "weep". Commercial non-fat dry toppings have a yield of about 300 to 400% when freshly whipped, and they may hold up for about 3 hours or so at ambient temperatures. Under refrigeration, they may last for about 24 hours or so.

SUMMARY OF THE INVENTION

The present invention provides an essentially non-fat, all purpose whip topping or foaming agent which, when dried by spray drying or other drying systems and reconstituted by whipping with cold water or with hot water yields up to about 1800%. The topping which results is firm and stable and holds up from 5 to 6 hours at ambient temperatures. It may be thawed and rewhipped when frozen, and will be stable in a protective package for indefinite periods of time.

Basically, the whipping composition of the present invention comprises at least 75% by weight of a mixture of at least one maltodextrin and corn syrup solids, with from 5 to 10% by weight of a polyoxyethylene sorbitan stearate containing from 15 to 25 ethylene oxide groups per molecule, from 0.20 to 1.0% of a food stabilizer, and the balance, being essentially a glyceride in which at least 90% of the ester groups present are long chain monoester groups.

DESCRIPTION OF THE PREFERRED EMBODIMENTS

In the compositions of the present invention, I particularly prefer to use a mixture of maltodextrin and corn syrup solids, these materials serving as bodying and drying agents. The relative proportions among the two ingredients in the mixture will vary depending upon the particular product desired.

One commercial product which may be used as a source of maltodextrins and corn syrup solids is put out by American Maize-Products company under their trademark "FRO-DEX". These compositions are pure white carbohyrates composed essentially of dextrose-maltose combinations and high molecular weight saccharides. The DE values range from 10 to 42.

Another essential ingredient in the present invention is a non-ionic emulsifier which consists of a glyceride ester in which at least 90% of the ester groups present are monoesters containing from 10 to 24 carbon atoms. Such compositions are available commercially under the trademark "Myverol" types 18-04, 18-06 and 18-07. The 18-04 product is a hydrogenated palm oil while the 18-06 and the 18-07 products are both hydrogenated vegetable oils. The glyceride ester is normally present in amounts of from 5 to 20% of the composition.

The non-ionic emulsifying composition is stabilized by means of another non-ionic emulsifier such as the materials known as "Tween 60" and "Tween 65". These materials are polyoxyethylene sorbitan stearates and could be the monostearate or the tristearate, or mixtures of the two. The polyoxyalkylene groups in each molecule typically average about 20 but may be from about 15 to 25. The polyoxyalkylene sorbitan stearate may constitute from about 5 to 10% by weight of the composition.

Any compatible food-type stabilizer can be employed for purposes of the present invention. These stabilizers can be added in amounts ranging from about 0.2 to 1.0% and may include materials such as alginates, xanthan gums, methyl cellulose, carboxy methyl cellulose, and the like. Suitable commercial materials include "Keltose" (refined algin) and "Keltrol" (xanthan gum) both marketed by Kelco Company.

The following examples illustrate various formulations produced according to the present invention.

EXAMPLE 1

| | |
|---|---|
| "Fro-Dex 10" Malto Dextrin | 85.00 parts by weight |
| "Tween 60" | 5.00 parts by weight |
| "Myverol 18-04" | 10.00 parts by weight |

EXAMPLE 2

| | |
|---|---|
| "Fro-Dex 10" Malto Dextrin | 75.00 parts by weight |
| "Keltose" stabilizer | 1.00 parts by weight |
| "Tween 60" | 6.50 parts by weight |
| "Myverol 18-06" | 18.50 parts by weight |

EXAMPLE 3

| | |
|---|---|
| "Fro-Dex 10" Malto Dextrin | 90.00 parts by weight |
| "Myverol 18-07" | 6.00 parts by weight |
| "Tween 60" | 3.00 parts by weight |
| "Keltrol" stabililizer | 1.00 parts by weight |

The "Fro-Dex 10" in the above formulations contains about 1% monosaccharides, about 4% disaccharides, about 5% trisaccharides and about 90% of tetrasaccharides and higher, on a dry basis.

The process of compounding the ingredients of the composition proceeds as follows. The fatty acid materials, consisting of the polyoxyethylene sorbitan stearate and the glyceride ester are put into a steam kettle and brought to a temperature of 150° F (65° C) with slow agitation. Then, hot water is added to the agitated mixture and the temperatures kept below 150° F with slow stirring. The maltodextrins are then added to the mixture with slow agitation unitl they are thoroughly dissolved. This mixture is then homogenized at about 500 psi pressure in a single stage up to about 1500 psi if necessary. The temperature is kept at approximately 150° F. The homogenized mixture is then passed to a drier which may be a spray drier of the conical or horizontal type at a temperature of about 250° F to 300° F (121° to 149° C). Temperatures should be kept as low as possible to effect proper drying. The material is then removed from the dryer and placed in cool storage.

A whipping test was performed on the spray dried powder of the present invention by combining 2 ounces (56.8 grams) of the spray dried powder with 6 ounces (470) grams of hot water. The mixture was whipped in a Hobart mixer at high speed. The product evidenced a yield of 1800%.

It will be understood that various modifications can be made to the described embodiments without departing from the scope of the present invention.

I claim as my invention:

1. A substantially fat-free dried whipping composition capable of being reconstituted by whipping with water to a high yield topping, said composition comprising at least 75% by weight of a mixture of at least one maltodextrin and corn syrup solids, said mixture having a DE value in the range from 10 to 42, from 5 to 10% by weight of a polyoxyethylene sorbitan stearate containing from 15 to 25 ethylene oxide groups, from 0.2 to 1% of a food stabilizer, and the balance being essentially a glyceride ester in which at least 90% of the ester groups present are long chain monoester groups.

2. The composition of claim 1 in which said stabilizer is an alginate.

3. The composition of claim 1 in which said stabilizer is a xanthan gum.

4. The composition of claim 1 in which said glyceride ester constitutes from 5 to 20% by weight of said composition.

* * * * *